Aug. 10, 1926.
B. A. WILLIAMS
HARROW
Filed Oct. 7, 1925
1,595,843
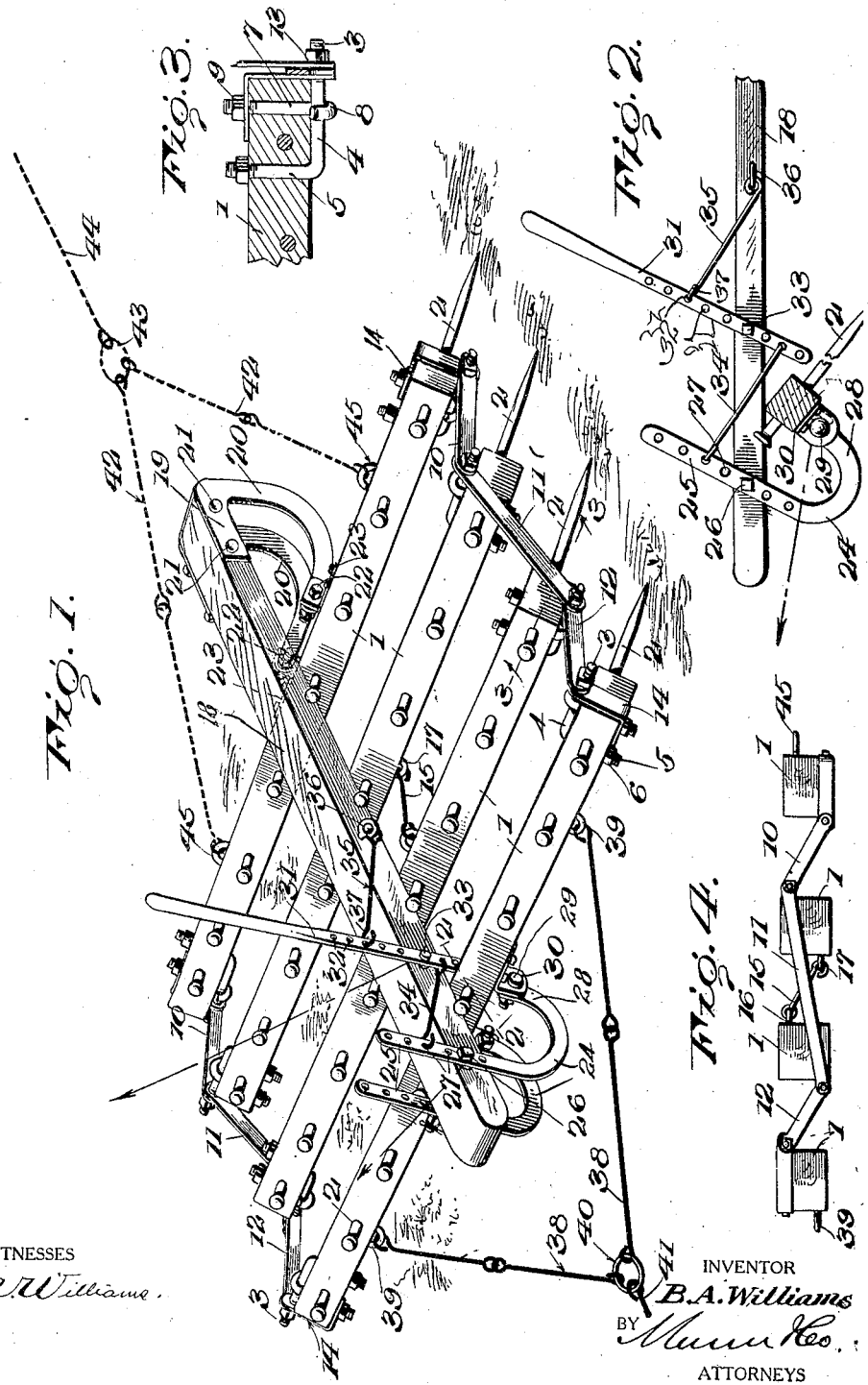
WITNESSES
INVENTOR
B. A. Williams
BY
ATTORNEYS Patented Aug. 10, 1926.

1,595,843

UNITED STATES PATENT OFFICE.

BENTON A. WILLIAMS, OF WATERTOWN, TENNESSEE.

HARROW.

Application filed October 7, 1925. Serial No. 61,097.

My invention relates to improvements in harrows of that type having a body formed of a plurality of bars which carry the harrow teeth and are adjustably connected with one another so that the harrow bars can be adjusted to vary the inclination to the horizontal of the harrow teeth.

The invention consists in the combination, constructions and arrangements herein described and claimed.

An object of the invention is the provision in a harrow of the class described, of simple, reliable and efficient means for connecting the ends of the respective harrow bars so that relative endwise movement of the harrow bars is prevented, without interfering with the adjustment of the harrow bars to vary the inclination to the horizontal of the teeth which the harrow bars carry.

A further object of the invention is the provision in a harrow of the character described of a novel means for adjusting the individual harrow bars to adjust the inclination of the harrow teeth to the horizontal and to releasably hold the harrow bars in adjusted position.

Other objects and advantages of the invention will be apparent from the following description, considered in conjunction with the accompanying drawings, in which:—

Figure 1 is a perspective view of the improved harrow,

Figure 2 is a fragmentary vertical sectional view taken substantially along the line 2—2 of Figure 1, Figure 3 is a fragmentary vertical sectional view taken along the line 3—3 of Figure 1, and Figure 4 is an end view of the body of the harrow showing the means for flexibly connecting the ends of the harrow bars.

The body of the improved harrow comprises a plurality of bars 1 each of which carries a longitudinal series of spaced teeth 2 which are rigid with the bars 1 and depend below the lower faces of the bars 1. The body of the harrow which is illustrated in the drawings comprises four of the bars 1 and the bar 1 which is shown in Figure 1 as being nearest to the bottom of the sheets of drawings may be considered as the front bar of the body of the harrow.

Each of the opposite end portions of each of the bars 1 carries an extending pivot element 3 which is shown as being an end portion of one arm 4 of a right angular rod which also comprises an arm 5 in addition to the arm 4. The arms 5 of the right angular rods 4—5 which are applied to the end portions of the front bar 1 are extended from the rearward face of the front bar 1 through transverse openings which are formed in the end portions of the front bar 1 above the longitudinal median line of the latter. Figure 3 illustrates to advantage the arrangement of the right angular rods 4—5 with the end portions of the respective bars 1. It will be observed that the arms 5 of the right angular rods 4—5 which are applied to the bar 1 that is second from the front of the body of the harrow are projected from the front side of such bar 1 through transverse openings which are formed in the end portions of the bar 1 that is second from the front of the body of the device below the longitudinal center line of that bar 1. The arms 5 of the right angular rods 4—5 that are applied to the third bar 1 from the front are projected from the rear side of that bar 1 through transverse openings which are formed in the end portions of the bar 1 that is third from the front above the longitudinal center line of that bar 1. The arms 5 of the right angular rods 4—5 that are applied to the rear bar 1 are projected from the front side of that bar 1 through transverse openings which are formed in the end portions of the rear bar 1 below the plane of the longitudinal center line of the rear bar 1. The extending end portions of the arms 5 are provided with screw threads for engagement with nuts 6 which are tightened against the respective bars 1 with which they are associated to hold the arms 4 to said bars 1. The arms 4 of the right angular rods 4—5 are secured in positions to extend in parallel relation to the longitudinal axes of the bars 1 with which they are associated so that the end portions of the arms 4 extend beyond the corresponding ends of the bars 1 to provide the hereinbefore mentioned pivot elements 3. The holding of the arms 4 against movement from the positions just mentioned on the bars 1 with which they are associated preferably is effected by means of clamping bolts or rods 7 which extend through transverse openings in the end portions of the bars 1, each of the clamping members 7 having a substantially U-shaped portion 8 at one end thereof embracing the arm 4 of the associated rod 4—5. The opposite end portion of the clamping member 7 is provided with screw threads and is engaged by a nut 9 which is tightened to hold the U-shaped portion 8 of the holding member 7 in clamping relation to the arm 4 of the associated rod 4—5. The extending end portions 3 of the arms 4 of the rods 4—5 on the rear bar 1 are connected with the extending end portions 3 of the rods 4—5 on the bar 1 second from the rear by links 10 which are bars having openings in their end portions through which said end portions 3 of the rods 4—5 on the rear bar 1 and the bar 1 next thereto extend. The extending end portions of the rods on the two middle bars 1 of the body of the harrow are connected by links 11 which likewise are bars having openings in their end portions for the reception of the associated end portions 3 of the rods 4—5 on said two middle bars 1. The links 12, which also are bars having openings in the end portions thereof through which the extending end portions 3 the right angular rods 4—5 on the end portions of the front bar 1 and the second bar 1 from the front extend, connect the front bar 1 with the bar 1 which is next thereto. Nuts 13 threadedly engage the end portions 3 of the right angular rods 4—5 to prevent displacement of the links which connected adjacent bars 1. If desired, right angular reinforcing plates 14 may be disposed against the end portions of the bars 1, each plate 14 including a member disposed flatwise against the adjacent end of the bar 1 with which it is associated, and a member which is disposed flatwise against the face of the bar which is opposite the arm 4 of the associated right angular rods 4—5. Each plate 14 is retained in position on the end portion of the associated bar 1 by openings in the members thereof through which the holding member 7 and the arm 4 of the associated rod 4—5 respectively extend. While I show the reinforcing plates 14 applied to the end portions of the front and rear bars 1 only, it is obvious that such plates may be applied to the end portions of the remaining bars 1 if desired.

The two middle bars 1 are also additionally connected intermediate their ends by a link 15 which, as best seen in Figure 4, is connected at its forward end to an eye member 16 which is carried by the bar 1 that is second from the front on the rear face of the latter above the plane of the longitudinal median or central line of that bar 1. The link 15 is connected at its rear end to an eye member 17 which is carried by the bar 1 that is next to the rear bar 1, the eye member 17 extending forwardly from the bar 1 that is next to the rear bar 1 below the plane of the longitudinal center line of that bar 1.

With the arrangement just described, it is manifest that the bars 1 are adjustably connected so that these bars 1 can be turned about their longitudinal axes to vary the inclination of the teeth 2 to the horizontal and that the respective bars 1 are securely held against relative longitudinal movements thus preventing the bars 1 from slipping longitudinally until the corresponding teeth of adjacent bars 1 track, such teeth normally being out of line with one another. In addition, the links at the ends of the bars 1 provide closures for the spaces between adjacent bars 1 at the ends of the latter and prevent the ends of the bars 1 from becoming engaged with obstructions such as rocks, stones, and the like.

The invention also provides an efficient means for adjusting all the bars 1 simultaneously to vary the inclination of the teeth 2 to the horizontal, of all the bars 1 to the same extent. This adjusting device comprises an adjusting bar 18 which extends across the series of bars 1 intermediate the ends of the bars. The rearward end portion of the adjusting bar 18 has the forwardly extending attaching end portions 19 of a pair of arcuately curved arms 20 secured rigidly to opposite edge portions of the adjusting bar 18 by fastening devices 21. The arms 20 are attached at their forward ends by horizontal elements 22 to rearwardly extending arms of brackets 23 which are secured on the rearward face of the rear harrow bar 1.

A pair of substantially U-shaped supporting bars 24 have relatively long arms 25 straddling the forward end portion of the adjusting bar 18 in advance of the front bar 1 and adjustably and pivotally connected with the forward end portion of the adjusting bar 18 by cap bolts 26 which are projected through openings 27 in the arms 25 and are detachably engaged with aligned sockets in the opposite or side edge portions of the extending forward end portion of the adjusting bar 18. The arms 25 of the supporting members 24 have longitudinally extending series of the openings 27 formed therein. The supporting bars 24 also include shorter arms 28 which are attached at their extremities by horizontal pivot elements 29 to the forwardly extending arms of brackets 30 which are secured on the front face of the front bar 1. A lever 31 has a longitudinally extending series of spaced openings 32 formed therein extending from the lower end of the lever for part of the length thereof. A cap bolt 33 may be projected through any one of the openings 32 and engaged releasably with a lateral opening in the adjusting bar 18 rearwardly of the front harrow bar 1. The cap bolt 33 constitutes a fulcrum for the lever 31. A link 34 connects the upper end portion of the arm 25 of one of the supporting members 24 with the lower end portion of the lever 31, the forward end portion of the link 34 preferably being engaged with one of the openings 27 and the rearward end portion of the link 34 being engaged with one of the openings 32. It therefore will be manifest that the lever 31 can be swung around the axis of the cap bolt 33 to transmit motion through the link 34 and the supporting bars 24 to the adjusting bar 18 and to the front harrow bar 1, and that operation of the lever 31 will cause the harrow bars 1 to be turned simultaneously about their longitudinal axes to vary the inclination to the horizontal of the teeth 2 which the harrow bars carry. The depth to which the teeth 2 will penetrate into the earth therefore can be varied within limits at will. When the bars 1 have been adjusted to adjust the inclination of the teeth 2 to the horizontal as desired, the lever 31 is secured against accidental or casual swinging movement from such position, by means of a hook member 35 which is swingingly attached at its rearward end to the adjusting bar 18 as at 36, and has a hook portion 37 at its forward end adapted to be engaged with any one of the openings 32 in the lever 31 above the fulcrum of the lever.

A draft means that the invention provides comprises a pair of rearwardly diverging draft members 38 which are attached at their rearward ends to clevises 39 on the front harrow bar 1. The respective clevises 39 extend from the front face of the front harrow bar 1 at equal distances from opposite ends of the front bar 1 and below the horizontal plane of the longitudinal central line of the front harrow bar 1. The draft members 38 are attached at their forward ends to a ring 40 from which a main draft member 41 may extend.

A coupling appliance similar to that which is comprised of the parts 38, 40 and 41 is attached to the rear bar 1 and comprises a pair of branch draft members 42, a coupling ring 43 and a main draft member 44. The branch draft members 42 are attached at their forward ends to clevises 45 which, as best seen in Figure 4, extend rearwardly from the rear bar 1 above the level of the longitudinal central line of the latter. The rear draft appliance may be used to connect the harrow with another harrow of the same construction or with a drag, not shown, which may be of any suitable known or preferred construction.

Obviously the invention is susceptible of embodiments in forms other than that which is illustrated in the accompanying drawings and I therefore consider as my own all such modifications and adaptations thereof as fairly fall within the scope of the appended claims.

I claim:—

1. A harrow comprising a plurality of harrow bars, teeth carried by the harrow bars, alined pivot members extending beyond the opposite ends of each harrow bar, and rigid links connecting corresponding pivot elements of adjacent harrow bars, said extending pivot elements being end portions of arms of right angular supporting rods, each of said angular supporting rods having an arm extending transversely through the associated harrow bar, and clamping rods associated with said right angular supporting rods, each of said clamping rods comprising a portion extending transversely through the associated harrow bar, and having a curved portion embracing the first named arm of the associated right angular supporting rod to hold said first named arm of the associated supporting rod clamped against a side face of the associated harrow bar.

2. A harrow comprising a plurality of harrow bars, teeth carried by said harrow bars, links connecting the corresponding ends of adjacent harrow bars, and an adjusting device for said harrow bars, said adjusting device comprising an adjusting bar extending across said harrow bars intermediate their ends, a curved attaching arm rigidly secured at its upper end to the rearward end of said adjusting bar and pivotally connected at its other end to the rear harrow bar, a substantially U-shaped lever bar pivotally attached at its rearward end to the front harrow and pivotally and adjustably connected adjacent to its other end to the forward end portion of said adjusting bar to swing about a horizontal axis, an operating lever adjustably fulcrumed intermediate its ends on said adjusting bar rearwardly of the front harrow bar to swing about a horizontal axis, and a push and pull rod connecting the lower end portion of said operating lever with the upper end portion of the forward part of said substantially U-shaped lever bar.

3. A harrow comprising a plurality of harrow bars, teeth carried thereby, means flexibly connecting the opposite ends of said harrow bars, and a draft appliance comprising a pair of branch draft members connected at their rearward ends to the front harrow bar at equal distances from the transverse median line of said front harrow bar and below the level of the longitudinal central line of said front harrow bar, a main draft member, and a ring connecting the rearward end of said main draft member with the forward ends of said branch draft members.

4. A harrow comprising a plurality of harrow bars, teeth carried thereby, means flexibly connecting the opposite ends of said harrow bars, and a draft appliance comprising a pair of branch draft members connected at their rearward ends to the front harrow bar at equal distances from the transverse median line of said front harrow bar and above the level of the longitudinal central line of said front harrow bar, a main draft member, a ring connecting the rearward end of said main draft member with the forward ends of said branch draft members, a second draft appliance comprising a pair of branch draft members connected at their forward ends to the rear harrow bar equal distances from the transverse median line of said rear harrow bar and above the level of the longitudinal central line of said harrow bar, a main draft member, and a ring connecting said main draft member with the rearward ends of said last named branch draft members.

5. A harrow comprising a set of four parallel harrow bars each provided with depending teeth and each having alined pivot elements at the opposite ends thereof, the pivot elements of the front harrow bar being disposed both above and rearwardly of the longitudinal median line of said front harrow bar, the pivot elements of the harrow bar second from the front having its pivot elements located both below and in advance of its longitudinal median line, the pivot elements of the harrow bar third from the front having its pivot elements disposed both above and rearwardly of its longitudinal median line, and the rear harrow bar having its pivot elements located in advance of and below its longitudinal median line, rigid links connecting corresponding pivot elements of adjacent harrow bars and extending across the spaces between corresponding ends of adjacent harrow bars, an additional link connecting the middle portions of the harrow bars which respectively are second and third from the front of the harrow, and means connected with the front and rear harrow bars and operable to rock said front harrow bar about the axial line of its said pivot elements, whereby all of said harrow bars will be rocked simultaneously about the axial lines of their said pivot elements.

BENTON A. WILLIAMS.